(12) United States Patent
Li et al.

(10) Patent No.: US 10,432,807 B1
(45) Date of Patent: Oct. 1, 2019

(54) REMOTE POST-SCANNING WORKFLOW USING SCAN JOB IN SCAN JOB QUEUE

(71) Applicant: Xerox Corporation, Norwalk, CT (US)

(72) Inventors: Xing Li, Webster, NY (US); Sherry W. Zhang, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/133,738

(22) Filed: Sep. 18, 2018

(51) Int. Cl.
H04N 1/00 (2006.01)

(52) U.S. Cl.
CPC ..... *H04N 1/00482* (2013.01); *H04N 1/00331* (2013.01); *H04N 1/00413* (2013.01); *H04N 1/00493* (2013.01)

(58) Field of Classification Search
CPC ........... H04N 1/00482; H04N 1/00331; H04N 1/00413; H04N 1/00493
See application file for complete search history.

(56) References Cited

U.S. PATENT DOCUMENTS

| | | | |
|---|---|---|---|
| 6,167,462 A | 12/2000 | Davis et al. | |
| 6,459,499 B1 | 10/2002 | Tomat | |
| 7,139,102 B2 | 11/2006 | Minato | |
| 8,547,576 B2 | 10/2013 | Liu et al. | |
| 2002/0114021 A1 | 8/2002 | Lavender et al. | |
| 2002/0133492 A1* | 9/2002 | Goldstein | G06F 17/30861 |
| 2005/0057780 A1 | 3/2005 | Fujita et al. | |
| 2005/0081137 A1* | 4/2005 | Ferlitsch | H04N 1/00204 715/276 |
| 2006/0077411 A1* | 4/2006 | Mathieson | G06F 17/289 358/1.13 |
| 2007/0121147 A1 | 5/2007 | Corona et al. | |
| 2011/0116124 A1 | 5/2011 | Shin | |
| 2011/0313896 A1* | 12/2011 | Nuggehalli | G06K 9/00993 705/30 |
| 2015/0254153 A1 | 9/2015 | Liao | |

* cited by examiner

*Primary Examiner* — Iriana Cruz
(74) *Attorney, Agent, or Firm* — Gibb & Riley, LLC

(57) ABSTRACT

A computerized device has a computer interface configured to display a remote scan job menu for at least post-scanning processing options for scan jobs within scan job queues. A scanning device is configured to receive at least one of the scan jobs in at least one of the scan job queues. The scanner interface of the scanning device is configured to display at least one of the scan job queues and to receive selection of one of the scan jobs from one of the scan job queues to identify a selected scan job. The scanning device is configured to execute the selected scan job, by scanning items provided to the scanning device, to produce an electronic image file. The scanning device is also configured to process the electronic image file by performing post-scanning processing options within the selected scan job on the electronic image file.

20 Claims, 9 Drawing Sheets

REMOTE POST-SCANNING WORKFLOW USING SCAN JOB IN SCAN JOB QUEUE

BACKGROUND

Systems and methods herein generally relate to scanning methods and scanning systems, and more specifically to those methods and systems that involve workflows of processing that occur after items have been scanned.

Optical scanners have transformed the ability of humans to communicate. From the initial facsimile machines that seemed to almost magically "transport" printed sheets (sometimes across the globe) at the speed of light using single scan lines of monochrome marks sent to a distant receiving facsimile machine over telephone transmission systems, to optical character recognition (OCR) systems that have provided the world access to all of man's writings throughout the ages, to image scanning and manipulation systems that can alter reality through manipulation of images in photographs, to sophisticated 3D scanners used in combination with 3D printers that permit items to be practically teleported through time and space, scanners have had a true impact on society's thoughts, images, and connections.

Modern scanning and transmission systems have increased the usefulness of scanning equipment by allowing the user to specify multiple recipients of a single scan, where the user can enter the email addresses of one or more recipients at the local user interface of scanners. However, entry of such data into the sometimes-limited scanner interfaces can be challenging, where for example if a scan recipient's email address is not in the scanner's address book, the user would need to remember the address or take a note to the device and type it in, which can be time consuming and prone to errors.

Further, while users can provide the recipients' email addresses using remote computing devices that are network-connected to a scanner (e.g., Embedded Web Server, etc.), the items that are to be scanned need to be loaded in the scanner before the instructions to scan are sent from the remote device, which may be acceptable for single user devices, but such is not highly useful in typical office environments where a scanner is shared by many users.

SUMMARY

In view of such issues, various systems and applications are provided herein that include, among other components, a computerized device (that can be controlled by an application). The computerized device has a computer interface that is configured to, or controlled by the application to, display a remote scan job menu. The remote scan job menu is configured to display scanning options and post-scanning processing options. The computerized device is configured to, or controlled by the application to, create one or more scan jobs from inputs into the scanning options and the post-scanning processing options of the remote scan job menu. The remote scan job menu is configured to display selection options from among scan job queues into which the scan jobs will be sent. The remote scan job menu is also configured to receive selection of one of the scan job queues for each of the scan jobs.

In some systems herein, a computerized server device is in communication with the computerized device, and both are also in communication with a scanning device, through one or more computer networks. The computerized device is configured to, or controlled by the application to, add the scan jobs to corresponding selected ones of the scan job queues in response to the selection of one of the scan job queues. The scan job queues can be, for example, stored on the computerized device, the server device, and/or the scanning device; and further, each of the scan job queues can receive scan jobs from multiple computerized devices.

The scanning device is configured to, or controlled by the application to, receive at least one of the scan jobs in at least one of the scan job queues. The scanning device includes a scanner interface. The scanner interface is configured to, or controlled by the application to, display at least one of the scan job queues and menu options for selecting one of the scan jobs within the scan job queues. The scanner interface is also configured to, or controlled by the application to, receive selection of one of the scan jobs from one of the scan job queues to identify a selected scan job.

The scanning device also includes optical sensors and/or other scanning components. The scanning device is configured to, or controlled by the application to, execute the selected scan job in response to the selection of one of the scan jobs by scanning items provided to the scanning device using the optical sensors to produce an electronic image file. The scanning device is configured to, or controlled by the application to, process the electronic image file by performing the post-scanning processing options on the electronic image file.

For example, the scanning device can be configured to, or controlled by the application to, execute the selected scan job immediately after receiving the selection of one of the scan jobs (without any intervening processing between scan job selection and scan job execution). Thus, scanning device can be configured to, or controlled by the application to, execute the selected scan job by displaying, on the scanner interface, instructions to load the items to optical sensors of the scanning device and press a Start button; and a message that the items are being scanned, after which processing returns to the scan job selection menu.

In greater detail, the scanning options in the remote scan job menu can include items such as the number of pages to scan, the scanning resolution, the scanning orientation, the sheet size, etc. In contrast, the post-scanning processing options in the remote scan job menu can include items such as instructions to the scanning device to perform optical character recognition processing, image enhancement processing, and/or image compression processing of the electronic image file; and this type of post-scanning processing creates a "scanner processed" file.

Additionally, the post-scanning processing options in the remote scan job menu can include items such as instructions to the scanning device to transmit the electronic image file from the scanning device to one or more remote processing devices separate from the scanning device. These remote processing devices are configured to, or controlled by the application to, perform processing of the electronic image file including optical character recognition processing, image enhancement processing, image compression processing, and/or printing; and this type of post-scanning processing creates a "remote processed" file.

Further, the post-scanning processing options in the remote scan job menu can include items such as instructions to the scanning device to transmit the electronic image file or the scanner processed file from the scanning device to one or more recipient computerized devices separate from the computerized device (e.g., email transmissions, cloud storage transmissions, text transmissions, in app transmissions, etc.). In other alternatives, the post-scanning processing options can include items such as instructions to the remote processing devices to transmit the remote processed file from the remote processing device to the one or more recipient computerized devices separate from the computerized device, etc.

Also, the post-scanning processing options in the remote scan job menu can include a "repeat scan" option. Selection of the repeat scan option provides an input field configured to receive a "repeat amount" into the repeat scan option. When the repeat scan option is provided in the scan job, the scanning device is configured to, or controlled by the application to, repeat the process of executing the selected scan job a number of times equal to the repeat amount. Different items are scanned during each repeat of the selected scan job, and therefore each repeat of the selected scan job produces a different electronic image file. However, the scanning device is configured to, or controlled by the application to, subject each different electronic image file to the same post-scanning processing options of the selected scan job.

The scanner interface can be configured to, or controlled by the application to, display a menu option to edit one or more of the scan jobs in the scan job queues and/or the repeat scan option, etc. Selection of the editing option could display all the aforementioned scanning options and post-scan processing options. Selection of the repeat scan option would again provide an input for the repeat amount. Other similar options can be provided in the scanner interface.

Correspondingly, methods herein provide a remote scan job menu through a computer interface of a computerized device that is in communication with a scanning device. Thus, these methods display, on the remote scan job menu, scanning options and post-scanning processing options. In response, these methods receive inputs to the scanning options and the post-scanning processing options into the remote scan job menu. This permits a process of creating, by the computerized device, one or more scan jobs using the inputs to the scanning options and the post-scanning processing options.

In greater detail, the scanning options in the remote scan job menu can include items such as the number of pages to scan, the scanning resolution, the scanning orientation, the sheet size, etc. In contrast, the post-scanning processing options in the remote scan job menu can include items such as instructions to the scanning device to perform optical character recognition processing, image enhancement processing, and/or image compression processing of the electronic image file; and this type of post-scanning processing creates a "scanner processed" file.

Additionally, the post-scanning processing options in the remote scan job menu can include items such as instructions to the scanning device to transmit the electronic image file from the scanning device to one or more remote processing devices separate from the scanning device. These remote processing devices can be instructed to perform processing of the electronic image file including optical character recognition processing, image enhancement processing, image compression processing, and/or printing; and this type of post-scanning processing creates a "remote processed" file.

Further, the post-scanning processing options in the remote scan job menu can include items such as instructions to the scanning device to transmit the electronic image file or the scanner processed file from the scanning device to one or more recipient computerized devices separate from the computerized device (e.g., email transmissions, cloud storage transmissions, text transmissions, in app transmissions, etc.). In other alternatives, the post-scanning processing options can include items such as instructions to the remote processing devices to transmit the remote processed file from the remote processing device to the one or more recipient computerized devices separate from the computerized device, etc.

Additionally, these methods can provide the remote scan job menu by displaying a repeat scan option. When the repeat scan option is selected, these methods request and receive a repeat amount into the repeat scan option that indicates how many times the scan job will be repeated, if selected at the scanning device.

Further, these methods can display selection options from among scan job queues into which the scan jobs will be sent on the remote scan job menu. In response, these methods receive selection of one of the scan job queues for each of the scan jobs into the remote scan job menu. Also, these methods add the scan jobs to corresponding selected ones of the scan job queues (using the computerized device) in response to the selection of one of the scan job queues. In such processing, the scan job queues can be stored on one or more server devices that are in communication with the computerized device and the scanning device through a computer network, and the each of the scan job queues can receive scan jobs from multiple computerized devices.

The above provides for processing that receives (by the scanning device) at least one of the scan jobs in at least one of the scan job queues. This allows the process of displaying at least one of the scan job queues on a scanner interface of the scanning device. This displaying of the scan job queues on the scanner interface can further include displaying a menu option to edit one or more of the scan jobs in the scan job queues.

Thus, the scan job queues are displayed on the scanner interface to provide menu options for selecting one of the scan jobs within the scan job queues. In response, these methods receive (by the scanning device) selection of one of the scan jobs from one of the scan job queues through the scanner interface in order to identify a "selected scan job."

These methods also execute the selected scan job (using the scanning device) in response to the selection of one of the scan jobs, by scanning items provided to the scanning device, to produce an electronic image file. Further, such methods process the electronic image file by performing the post-scanning processing options, using at least the scanning device.

In some processing herein, the process of executing the selected scan job can be performed immediately after receiving the selection of one of the scan jobs, without intervening processing. In such an example, the execution of the selected scan job may only include displaying (using the scanning device on the scanner interface): instructions to load the items to optical sensors of the scanning device and press a Start button; and a message that the items are being scanned, after which processing returns to the scan job selection menu.

When the selected scan job includes the repeat scan option, these methods repeat the execution of the selected scan job (using the scanning device) a number of times equal to the repeat amount. When repeating the selected scan job, different items are scanned during each repeat of the execution of the selected scan job and, therefore, each repeat of the execution of the selected scan job produces a different electronic image file. However, each different electronic image file is subjected to the same post-scanning processing options of the selected scan job.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, entry of post-scanning processing into the sometimes-limited scanner interfaces can be challenging. Further, while users can provide post-scanning processing, such as recipients' email addresses, using remote computing devices that are network-connected to the scanner (e.g., Embedded Web Server, etc.), the items that are to be scanned need to be loaded in the scanner before the instructions to scan are sent from the remote device, which may be acceptable for single user devices, such is not useful in typical office environments where a scanner is shared by many users.

In view of such and other issues, the methods, applications, and systems herein provide remote scanning and post-scanning workflow management using scan job queues. Specifically, the methods, applications, and systems herein allow the user to create a scan job from a remote user interface and send the scan job to a scan job queue maintained by a multifunction device, where the job will wait in the scan job queue until activated by the user or another operator at the local interface of the scanner. The user at the scanner can select the scan job from the scan queue, make modifications if needed, and press the execute or start button to cause the full scan job (including post-scanning processing) to be completed automatically without additional user intervention or input.

Thus, for example with the methods and systems herein, the user can copy/paste email addresses from other applications on the user's computer, etc., to create a scan job and then submit the scan job to a scan job queue where it will be held until executed. Further, scan jobs can be saved on a user's computer (or remotely) as templates, allowing the user to recall a previously created scan job to be sent to a scan job queue for identical processing of a previous scan job.

Thus, by providing the option to hold the scan job submitted remotely in the device's scan job queue, the methods and systems herein allow the scan job to wait in the scan job queue to be released by the user to start the actual scanning. In other words, the user can submit the job remotely, walk to the device, load the documents to be scanned, and then execute the job. Also note that the user can be provided additional options at the scanner, such as options to make modifications to the scan settings, before pressing the start/execute button.

Figure 1:
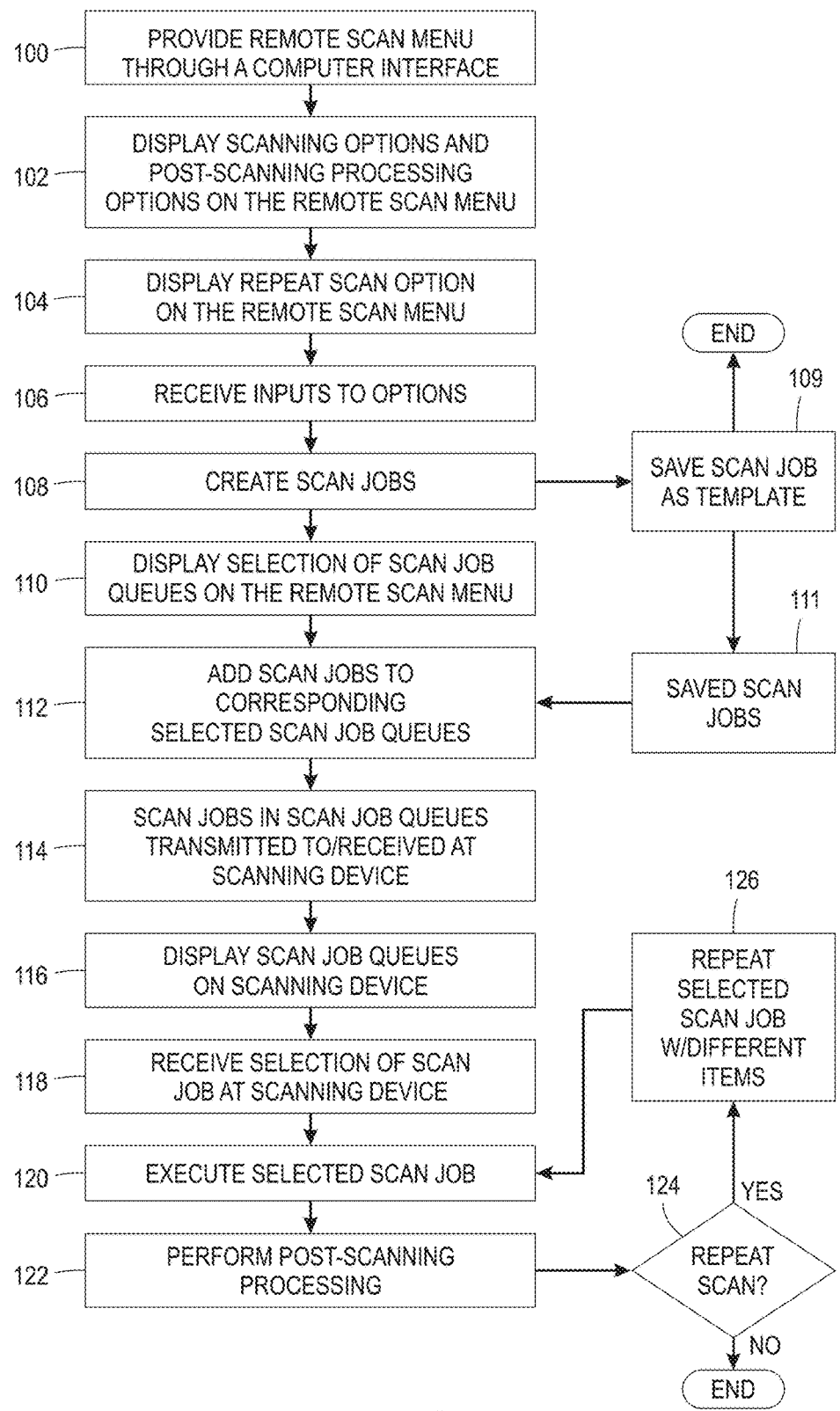
FIG. 1 is a flow diagram of various methods herein.

FIG. 1 is flowchart illustrating exemplary methods herein. In item 100, these methods provide a remote scan job menu through a computer interface of a computerized device that is in communication with a scanning device. In item 102, these methods display, on the remote scan job menu, scanning options and post-scanning processing options.

In greater detail, the scanning options in the remote scan job menu in item 102 can include items such as the number of pages to scan, the scanning resolution, the scanning orientation, the sheet size, etc. In contrast, the post-scanning processing options in the remote scan job menu in item 102 can include items such as instructions to the scanning device to perform optical character recognition processing, image enhancement processing, and/or image compression processing of the electronic image file produced by the scanning device; and this type of post-scanning processing creates a "scanner processed" file.

Additionally, the post-scanning processing options in the remote scan job menu in item 102 can include items such as instructions to the scanning device to transmit the electronic image file produced by the scanning device to one or more remote processing devices separate from the scanning device. These remote processing devices can be instructed in the post-scanning processing options to perform processing of the electronic image file including optical character recognition processing, image enhancement processing, image compression processing, and/or printing; and this type of post-scanning processing creates a "remote processed" file.

Further, the post-scanning processing options in the remote scan job menu in item 102 can include items such as instructions to the scanning device to transmit the electronic image file or the scanner processed file from the scanning device to one or more recipient computerized devices separate from the computerized device (e.g., email transmissions, cloud storage transmissions, text transmissions, in app transmissions, etc.). In other alternatives, the post-scanning processing options in item 102 can include items such as instructions to the remote processing devices to transmit the remote processed file from the remote processing device to the one or more recipient computerized devices separate from the computerized device, etc.

As shown in item 104 in FIG. 1, these methods can display a repeat scan option the remote scan job menu. When the repeat scan option is selected by the user, these methods request that a "repeat amount" be supplied that indicates how many times the scan job will be repeated, if selected at the scanning device.

In response in item 106, these methods receive inputs from the user (to the scanning options and post-scanning processing options, and possibly the repeat scan option, if selected) into the remote scan job menu. This permits the methods herein to perform the processing in item 108 of creating, by the computerized device, one or more scan jobs using the inputs to the scanning options and the post-scanning processing options. The scan job can be provided a unique name in item 108 and then can be optionally saved as a scan job template for future use in item 109. In item 109, the scan job template can be saved locally on a user's computerized device, and/or remotely on a server, etc. as a saved scan job 111. In some options, the user can merely make up a scan job template, without placing such a scan job template in a scan job queue, and end processing at that point, as indicated by the arrow going to end above item 109 in FIG. 1.

Further, as shown in item 110 in FIG. 1, these methods can display selection options from among scan job queues into which the scan jobs will be sent on the remote scan job menu. In response, these methods receive from the user selection of one or more of the scan job queues for each of the scan jobs into the remote scan job menu. These methods then add the scan jobs to corresponding selected ones of the scan job queues (using the computerized device) in response to the selection of one of the scan job queues, in item 112. Further, if desired, ones of the saved scan jobs 111 can also be added to various scan job queues in item 112. In such processing in item 112, the scan job queues can be stored on one or more server devices that are in communication with the computerized device and the scanning device through a computer network, and each of the scan job queues can receive scan jobs from multiple computerized devices.

The above provides for processing that receives (by the scanning device either being send the scan job queues or accessing the scan job queues) at least one of the scan jobs in at least one of the scan job queues in item 114. This allows a process of displaying at least one of the scan job queues on the scanner interface of the scanning device in item 116. This displaying of the scan job queues on the scanner interface in item 116 can further include displaying a menu option to edit one or more of the scan jobs in the scan job queues.

Thus, the scan job queues are displayed on the scanner interface to provide menu options for selecting one of the scan jobs within the scan job queues, as shown in item 116. In response, in item 118 these methods receive (by the scanning device) selection of one of the scan jobs from one of the scan job queues through the scanner interface in order to identify a "selected scan job."

As shown in item 120, these methods also execute the selected scan job (using the scanning device) in response to the selection of one of the scan jobs in item 118, by scanning items provided to the scanning device, to produce an electronic image file. Further, such methods process the electronic image file by performing the post-scanning processing options in the selected scan job (detailed above) using at least the scanning device, in item 122.

In some processing herein, the process of executing the selected scan job 120 can be performed immediately after receiving the selection of one of the scan jobs 118, without intervening processing. In such an example, the execution of the selected scan job 120 may only the limited steps of displaying (using the scanning device on the scanner interface): instructions to load the items to optical sensors of the scanning device and press a Start button; and a message that the items are being scanned, after which processing returns to the scan job selection menu.

As shown in decision box 124, if/when the selected scan job includes the repeat scan option selected in item 104, these methods repeat the execution of the selected scan job (using the scanning device) a number of times equal to the repeat amount, as shown by item 126 which returns processing to the scan execution item 120. Thus, item 126 controls the repeat loop through 120, 122, 124, and 126 to limit the looping to the repeat amount.

When repeating the selected scan job 126, different items are scanned during each repeat of the execution of the selected scan job 120 and, therefore, each repeat of the execution of the selected scan job produces a different electronic image file. However, each different electronic image file is subjected to the same post-scanning processing options of the selected scan job in item 122.

Figure 2:
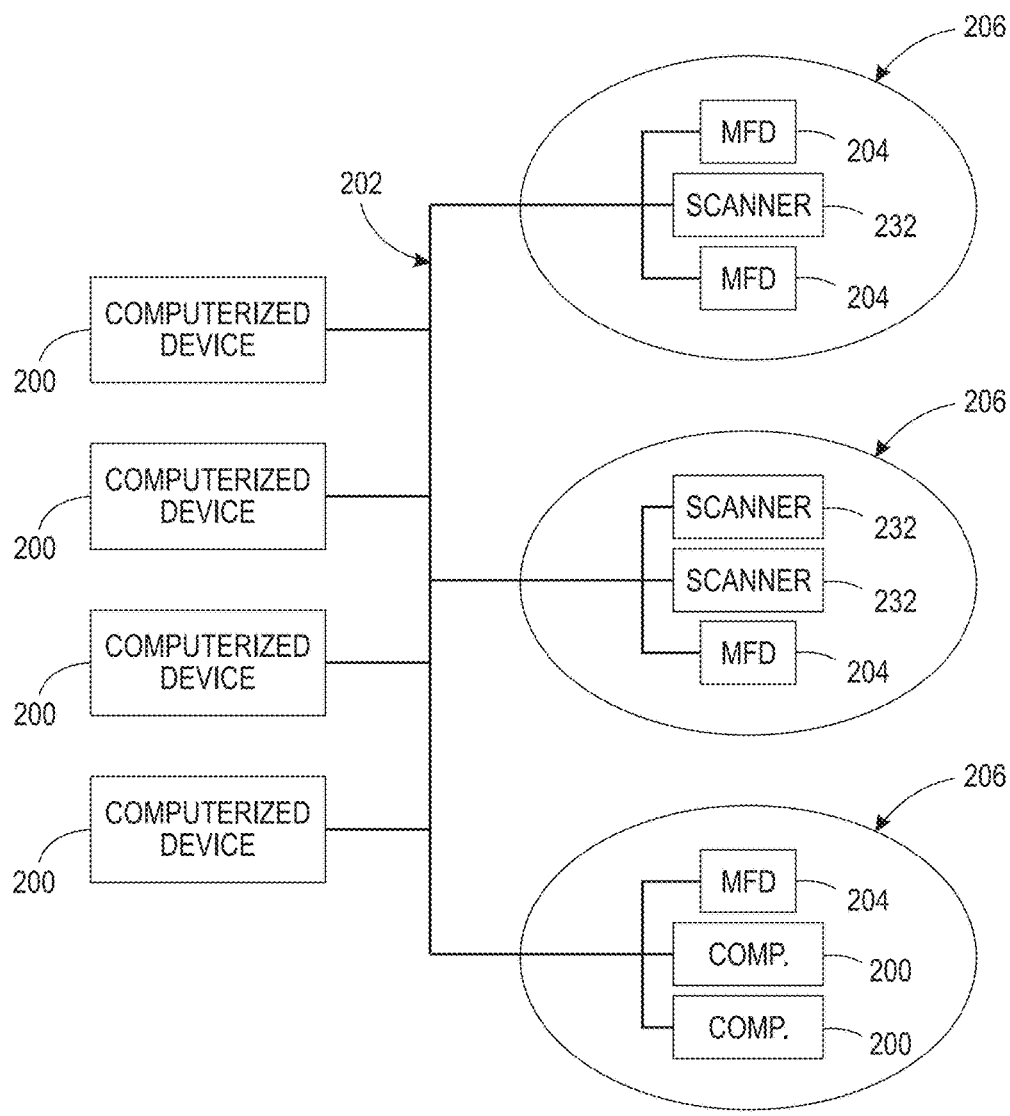
FIG. 2 is a conceptual schematic diagram illustrating systems herein.

As shown in FIG. 2, exemplary systems herein include various devices located at various different physical locations 206. The devices can include servers 208, printing devices 204 (multi-function devices (MFDs), personal computers 200, etc., and such are in communication (operatively connected to one another) by way of a local or wide area (wired or wireless) network 202.

Figure 3:
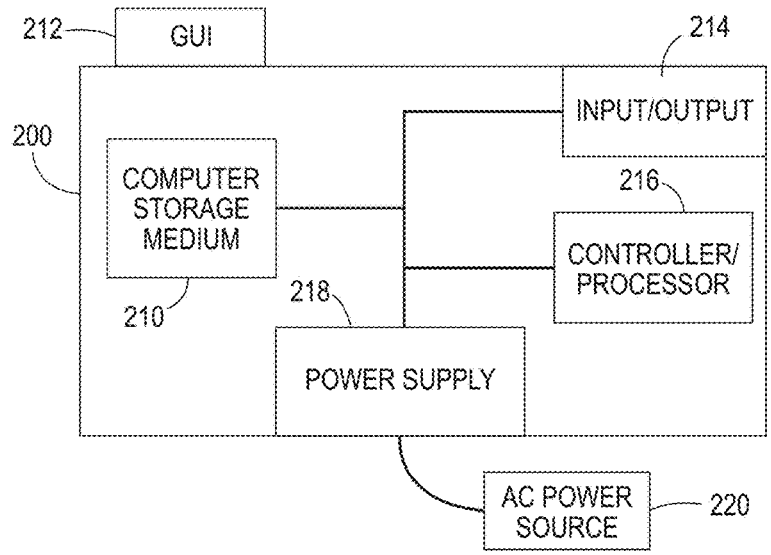
FIG. 3 is a conceptual schematic diagram illustrating devices herein.

FIG. 3 illustrates one example of one of the computerized devices 200 (and the computer servers 208 can have similar components) which can be used with systems and methods herein and can comprise, for example, a print server, a personal computer, a portable computing device, etc. The computerized device 200 includes a controller/tangible processor 216 and a communications port (input/output (I/O)) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. For example, the computer storage medium device 210 can store computer applications or computer programs that control the other components of the device to perform the methods described herein. Thus, as shown in FIG. 3, a body housing has one or more functional components that operate on power supplied from an alternating current (AC) source 220 by the power supply 218. The power supply 218 can comprise a common power conversion unit, power storage element (e.g., a battery, etc.), etc.

Figure 4:
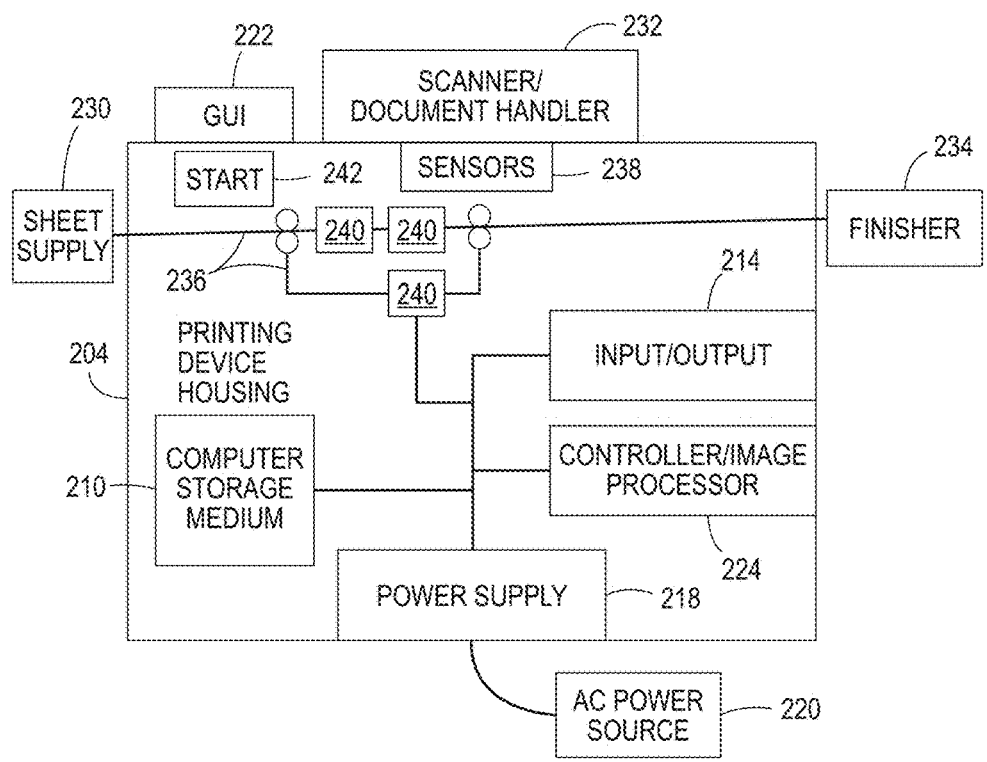
FIG. 4 is a conceptual schematic diagram illustrating devices herein.

FIG. 4 illustrates a computerized device that is a multi-function scanning/printing device 204, which can be used with systems and methods herein and can comprise, for example, a printer, copier, document center, etc. The scanning/printing device 204 includes many of the components mentioned above and can include at least one marking device (printing engine(s)) 240 operatively connected to a specialized image processor 224 (that is different from a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that includes optical sensors 238, etc., that also operate on the power supplied from the external power source 220 (through the power supply 218). Again, an application can control the processor 224 and the other components to perform the methods described herein.

Therefore, as shown in FIGS. 2-4, various systems herein include, among other components, one or more computerized devices 200 having a computer interface 212 configured to, or controlled by an application to, display a remote scan job menu. The remote scan job menu is configured to display scanning options and post-scanning processing options. The computerized device 200 is configured to, or controlled by the application to, create one or more scan jobs from inputs into the scanning options and the post-scanning processing options of the remote scan job menu. The remote scan job menu is configured to display selection options from among scan job queues into which the scan jobs will be sent. The remote scan job menu is also configured to receive selection of one of the scan job queues for each of the scan jobs.

In some systems herein, a server 208 device is in communication with the computerized device 200, and both are also in communication with a scanning/printing device 204 through one or more computer networks 202. Note that while FIG. 4 illustrates one form of scanning device (MFD 204), other scanning devices herein can omit the printing components (not include the sheet supply 230, the sheet path 236, the printing engines 240, the finisher device 234, etc.) and be a dedicated scanner-only device 232 (that could include some components, such as I/O 214, GUI 222, storage 210, processor 224, power supply 218, etc.); and all of such scanning devices are intended to be shown in FIG. 4 and referenced by identification numerals 204/232.

The computerized device 200 is configured to, or controlled by the application to, add the scan jobs to corresponding selected ones of the scan job queues in response to the selection of one of the scan job queues. The scan job queues can be added, for example, by being electrically transmitted to (over the network 202), and stored on the computerized device 200, the server 208 device, and/or the scanning device 204/232; and further, each of the scan job queues can receive scan jobs from multiple computerized devices 200.

The scanning/printing device 204/232 is configured to, or controlled by the application to, receive (download or be transmitted) at least one of the scan jobs in at least one of the scan job queues. In one example, each scanning device 204/232 has a dedicated scan job queue, whereby sending the scan job to a specific scan job queue effectively sends it to a specific scanning device 204/232. In other examples, scan job queues can serve multiple scanning devices 204/232 where each scan job queue may encompass multiple scanning devices 204/232 at a single location, each scan job queue may be logically related to a specific user group, accounting group, activity area, etc.

Therefore, as shown in FIG. 4, the scanning device 204/232 includes a scanner interface 222. The scanner interface 222 is configured to, or controlled by the application to, display at least one of the scan job queues and menu options for selecting one of the scan jobs within the scan job queues. The scanner interface 222 is also configured to, or controlled by the application to, receive selection of one of the scan jobs from one of the scan job queues to identify a selected scan job.

The scanning device 204/232 also includes optical sensors 238 and/or other scanning components 232. The scanning device 204/232 is configured to, or controlled by the application to, execute the selected scan job in response to the selection of one of the scan jobs by scanning items provided to the scanning device 204/232 using the optical sensors 238 to produce an electronic image file. The scanning device 204/232 is configured to, or controlled by the application to, process the electronic image file by performing some or all of the post-scanning processing options on the electronic image file.

For example, the scanning device 204/232 can be configured to, or controlled by the application to, execute the selected scan job immediately after receiving the selection of one of the scan jobs (without any intervening processing between scan job selection and scan job execution). Thus, scanning device 204/232 can be configured to, or controlled by the application to, execute the selected scan job by displaying, on the scanner interface 222, instructions to load the items in a position allowing the optical sensors to scan the items 238 (e.g., place items on the scanner's platen, in the document handler/feeder, etc.) and press a Start button 242, then displaying a message that the items are being scanned.

Figure 5:
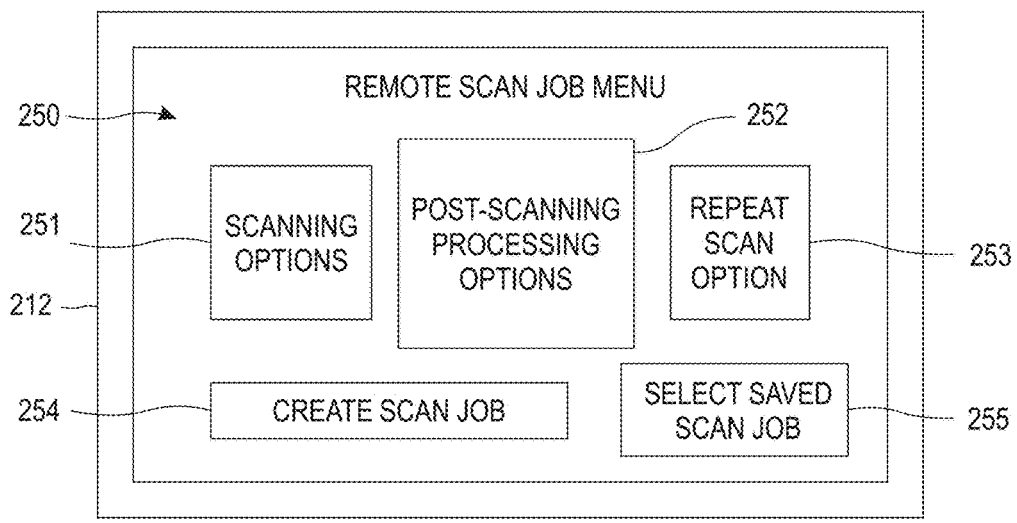
FIG. 5-17 are conceptual schematic diagrams of menus and messages provided on interfaces by methods and systems herein.

FIGS. 5-17 show some of the menus and messages provided by methods and systems herein. For example, FIG. 5 is a display presented on the graphic user interface 212 of the computerized device 200 and shows one example of a remote scan job menu 250 that includes menu selections for scanning options 251, post-scanning processing options 252, the repeat scan option 253, a create scan job option 254 (which can be selectable after at least one of the other options been selected), an option to select a previously saved scan job template 255, and other similar menu options. The menus in FIGS. 5-17 are only examples used to illustrate the concepts of the menus and messages provided by embodiments herein, and those ordinarily skilled in the art would understand that variants of the menus described and illustrated herein are indented to be included within the claims of this application.

Figure 6:
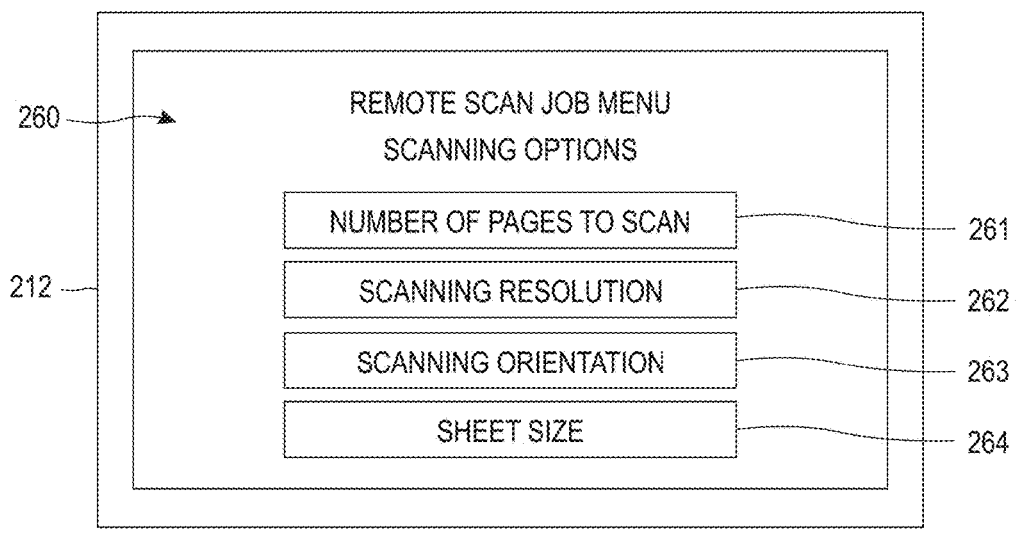

User selection of the scanning options 251 in FIG. 5 causes the graphic user interface 212 of the computerized device 200 to display a scanning options menu 260 similar in concept to the one shown in FIG. 6 (which can be a sub-menu of the remote scan job menu 250). As shown in FIG. 6, the scanning options menu 260 can include, for example, menu selections such as the number of pages to scan 261, the scanning resolution 262, the scanning orientation 263, the sheet size 264, and other similar menu options. After one or more inputs are provided to the menu shown in FIG. 6, the menu shown in FIG. 5 can once again be displayed.

Figure 7:
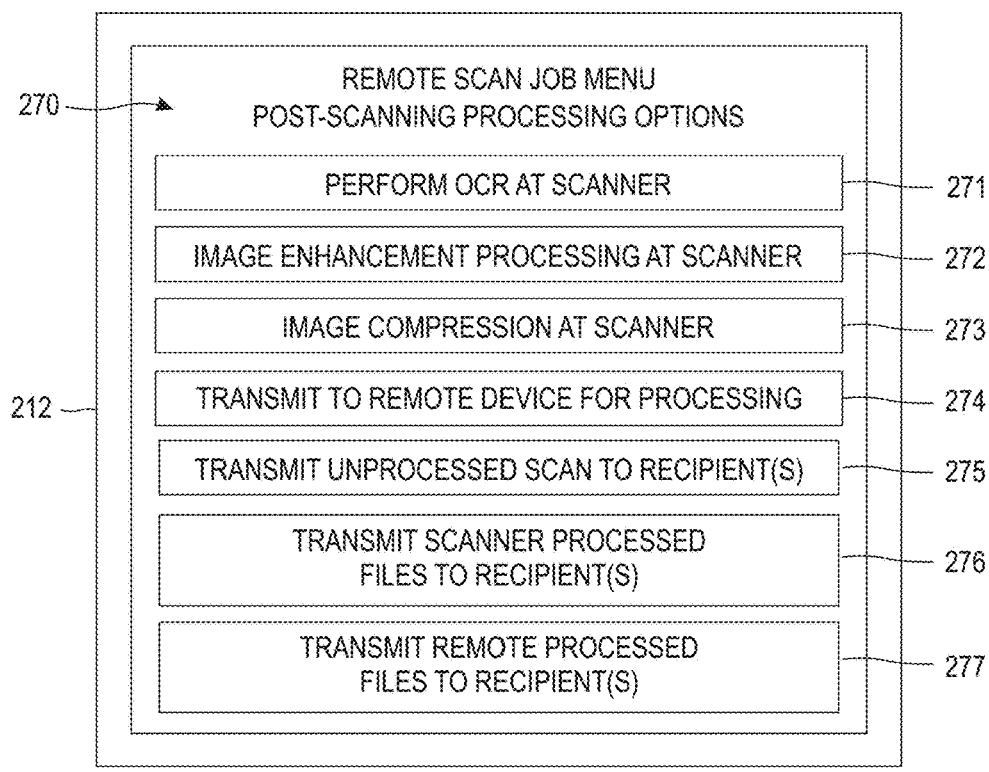

User selection of the post-scanning processing options 252 in FIG. 5 causes the graphic user interface 212 of the computerized device 200 to display a post-scanning processing options menu 270 similar in concept to the one shown in FIG. 7 (which can be a sub-menu of the remote scan job menu 250). After one or more inputs are provided by the user to the menu shown in FIG. 7, the menu shown in FIG. 5 can once again be displayed.

As shown in FIG. 7, the post-scanning processing options menu 270 can include items such as instructions to the scanning device to perform optical character recognition (OCR) processing 271, image enhancement processing 272, and/or image compression processing of the electronic image file 273, and other similar menu options; and this type of post-scanning processing creates a "scanner processed" file.

Figure 8:
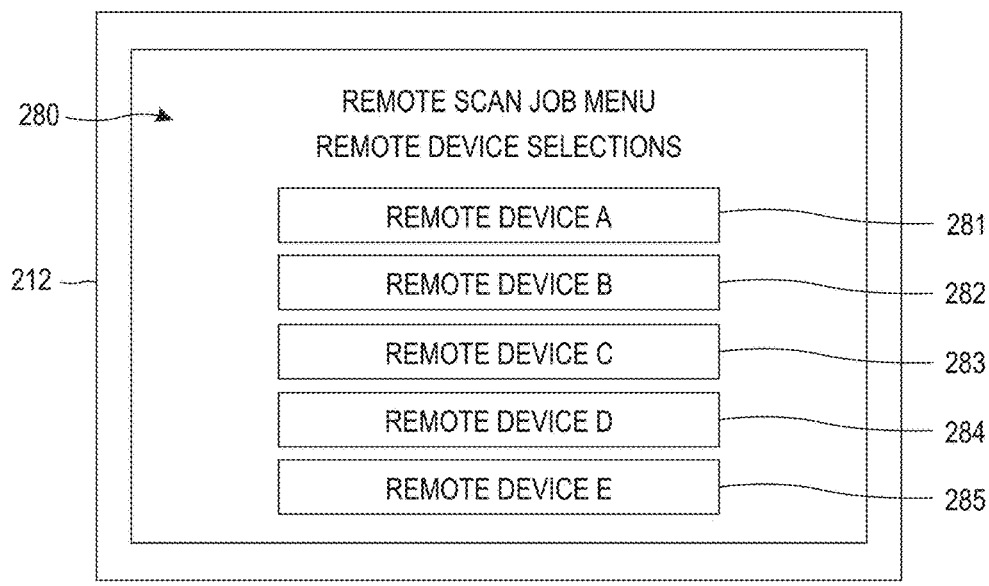

As also shown in FIG. 7, the post-scanning processing options menu 270 can also include menu selections such as instructions to the scanning device to transmit the electronic image file from the scanning device to one or more remote processing devices separate from the scanning device 274. User selection of the processing at remote processing devices option 274 in FIG. 7 causes the graphic user interface 212 of the computerized device 200 to display a remote device selection menu 280 similar in concept to the one shown in FIG. 8 (which can be a sub-menu of the post-scanning processing options menu 270). As shown in FIG. 8, user selection can be made among various remote devices A-E through selection menu choices 281-285.

Figure 9:
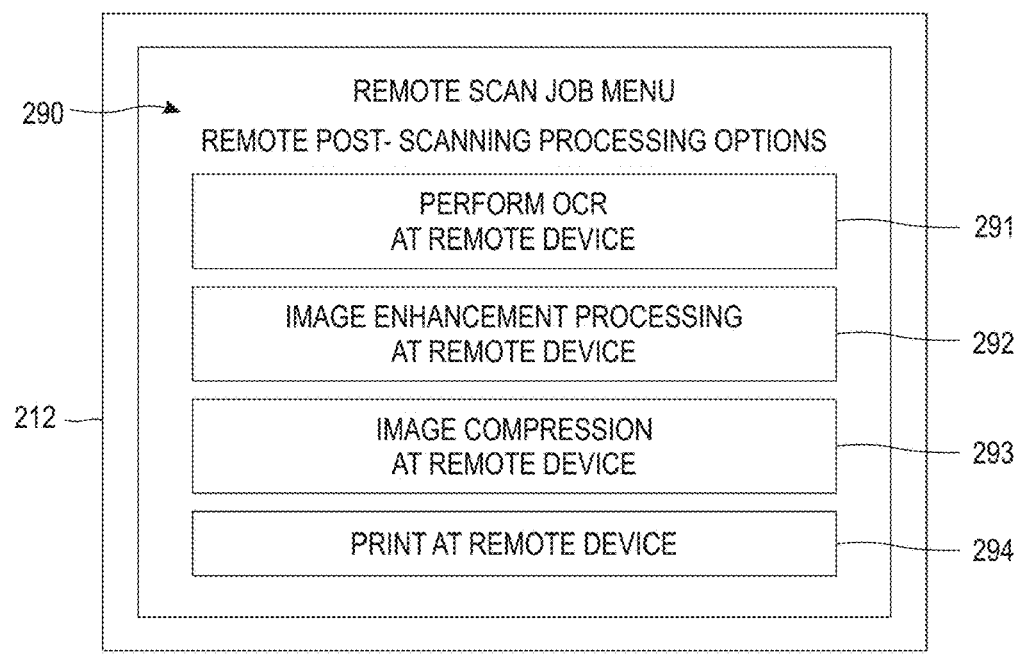

At each selection of one of the remote devices A-E through selection menu choices 281-285 in FIG. 8, in one implementation herein the graphic user interface 212 of the computerized device 200 is made to display a remote post-scanning processing options menu 290 similar in concept to the one shown in FIG. 9 (which can be a sub-menu of the remote device selection menu 280). As shown in FIG. 9, the remote processing devices can be similarly configured through additional similar menu selections to perform processing of the electronic image file including optical character recognition processing 291, image enhancement processing 292, image compression processing 293, and/or printing 294; and this type of post-scanning processing creates a "remote processed" file.

Figure 10:
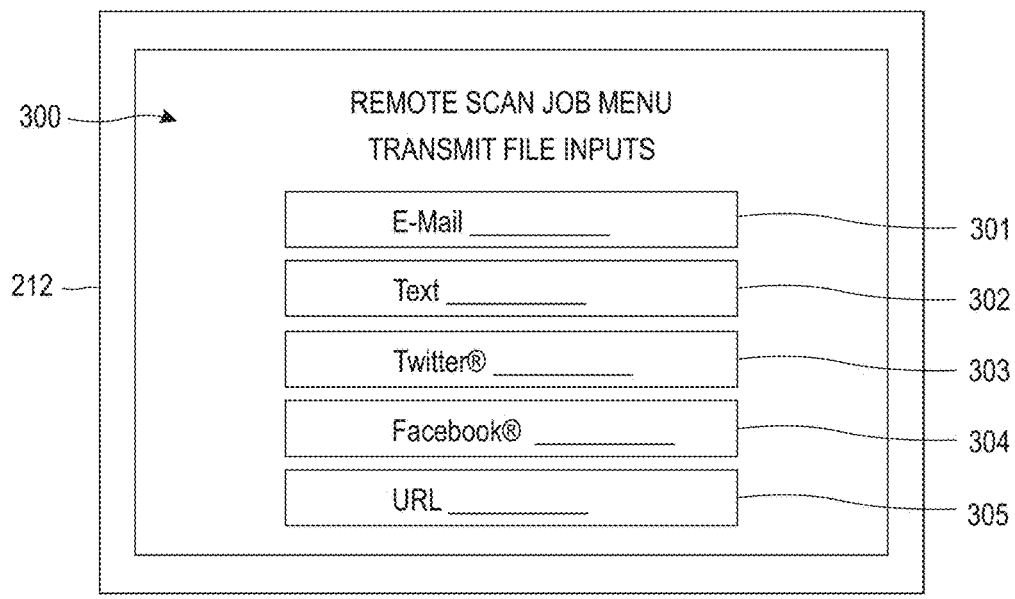

As further shown in FIG. 7, the post-scanning processing options menu 270 can include items such as instructions to the scanning device to transmit the unprocessed electronic image file produced by the scan to one or more recipients separate from the computerized device 275, to transmit the scanner processed file from the remote processing device to the one or more recipient computerized devices separate from the computerized device 276, to transmit the remote processed file from the remote processing device to the one or more recipient computerized devices separate from the computerized device 277, etc. If such transmission options 275-277 are selected by the user from the post-scanning processing options menu 270, the graphic user interface 212 of the computerized device 200 can be made to display a menu of inputs for such file transmissions conceptually similar to the transmit file input menu 300 shown in FIG. 10. More specifically, FIG. 10 illustrates that inputs can be provided by methods and systems herein to allow identification of various recipients such as email addresses 301, text addresses 302, social media or other app addresses (e.g., Twitter® account address 303, Facebook® account address 304, etc.) cloud storage transmissions or other network addresses (e.g., universal resource locator (URL) address 305).

Figure 11:
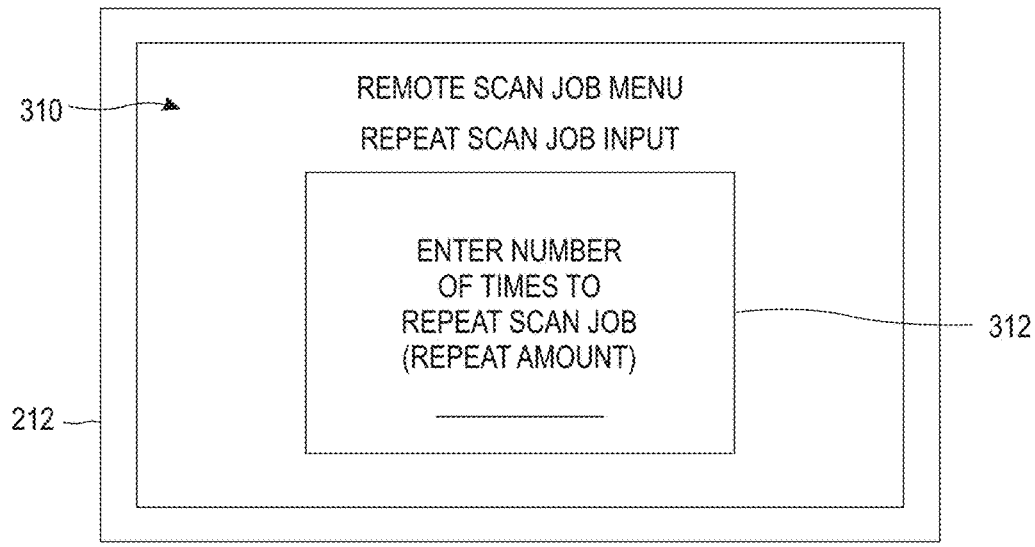

User selection of the repeat scan option 253 in FIG. 5 causes the graphic user interface 212 of the computerized device 200 to display a repeat scan job input menu 310 similar in concept to the one shown in FIG. 11. As shown in FIG. 11, the repeat scanning menu 310 includes an input field 312 configured to receive a "repeat amount" into the repeat scan option. After user inputs are provided to the menu shown in FIG. 11, the menu shown in FIG. 5 can once again be displayed.

As noted above, the computerized device 200 is configured to, or controlled by the application to, create one or more scan jobs from user inputs and selections to the scanning options 252 and the post-scanning processing options 254 of the remote scan job menu 250. More specifically, as shown in FIG. 5, after selecting one or more of the aforementioned options shown in FIGS. 5-11, an option conceptually similar to the create scan job menu option 254 in FIG. 5 can be selected. Selection of the create scan job menu option 254 in FIG. 5 creates a scan job that includes the various selections from the scanning options menu 260, the post-scanning processing options 270, the remote device selections 280, the remote post-scanning processing options 290, the transmit file inputs 300, the repeat option and repeat amount 310, etc. made by the user. Additionally, options can be provided for the user to name the scan job and place other restrictions on the scan job such as passwords, etc., through the create scan job menu option 254.

As noted previously, once a scan job has been created, it can be saved as a template (item 109, FIG. 1) and/or added to one or more scan job queues (item 112, FIG. 1). Additionally, the scan queues can be presented for selection through the interface 222 of the scanning device 204/232.

Figure 12:
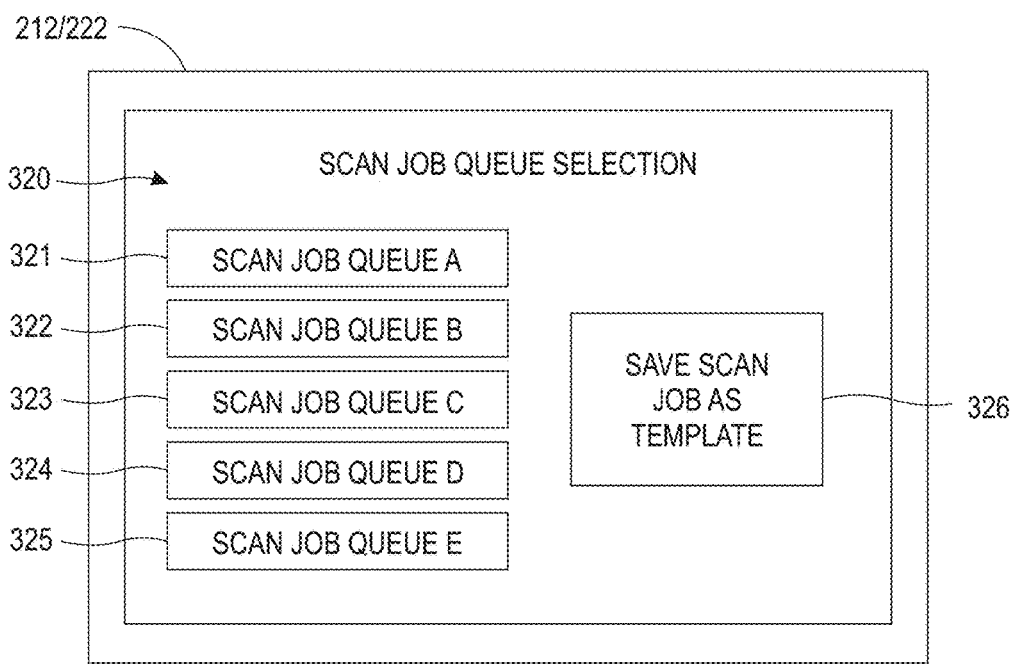

One exemplary presentation of the scan job queues is the scan job queue selection menu 320 shown in FIG. 12; and the same can be a submenu of the remote scan job menu 250 on the graphic user interface 212 of the computerized device 200, and/or the same can be presented on the graphic user interface 222 of the scanning device 204/232.

As shown in FIG. 12, the scan job queue selection menu 320 is configured to display selection choices from among scan job queues A-E (321-325). When the option to create a scan job 254 is selected from the remote scan job menu 250 in FIG. 5, the scan job queue selection menu 320 is displayed on the user interface 212 of the computing device 200. User selection of one of the scan job queues A-E (321-325) adds the scan job created (through the selection of menu choice 254) to the selected scan job queue.

Additionally, the user has the option to save the scan job as a template 326 in the scan job queue selection menu 320. As noted above, with the selection of option 326 in FIG. 12 the scan job can be provided a unique name and saved as a scan job template for future use, where the scan job template can be saved locally on a user's computerized device 200, and/or remotely on a server 208, etc., as a saved scan job.

Figure 13:
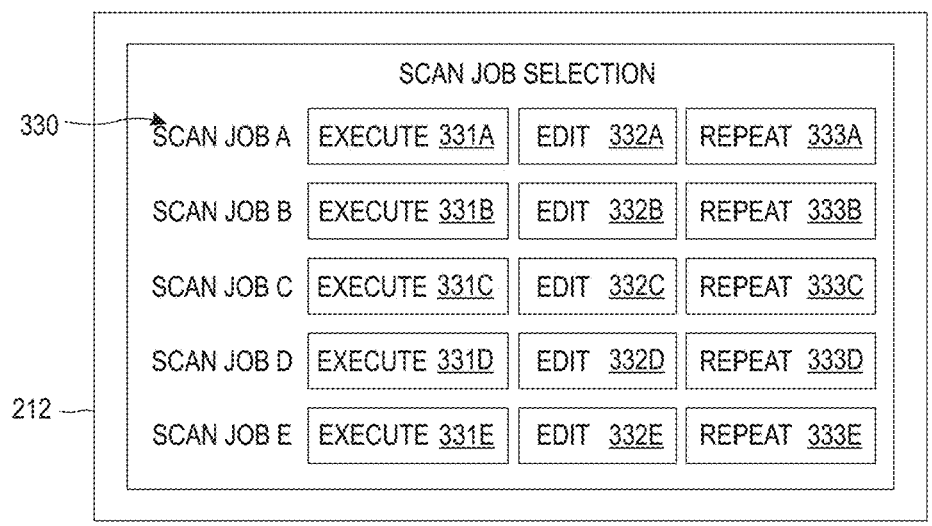
Figure 14:
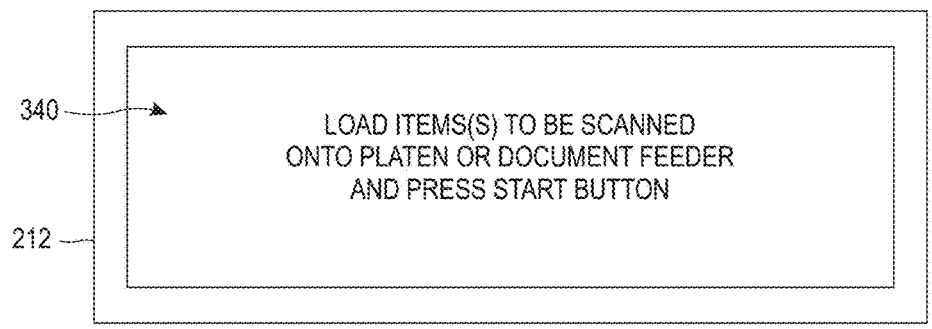
Figure 15:
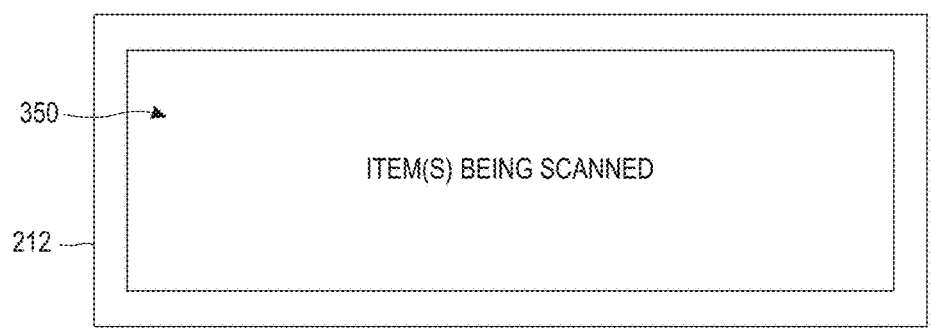

Further, selection of one of the scan job queues A-E (321-325) in FIG. 12 through the interface 222 of the scanning device 204/232 causes a menu conceptually similar to the scan job selection menu 330 shown in FIG. 13 to be displayed on the interface 222 of the scanning device 204/232. More specifically FIG. 13 shows one of many possible configurations of the scan job selection menu 330, where each different scan job (where the scan jobs are named Scan Job A-Scan Job E in this example) is provided a menu option to execute the scan job 331A-331E, a menu option to edit the scan job 332A-332E, and a menu option to repeat the scan job 331A-331E. Therefore, the scan job selection menu 330 shows scan job execution options (331A-331E), scan job edit options (332A-332E), and scan job repeat option (333A-333E) that correspond to scan jobs A-E.

User selection of the execute option 331A-331E will cause the scanning process and all selected post-scanning processing to occur automatically (without any additional user actions or menu selections). Therefore, in some implementations, upon the execute option 331A-331E being selected, the interface 222 of the scanning device 204/232 only displays instructions (340 FIG. 14) to load the items in a position allowing the optical sensors to scan the items (e.g., an instruction to load item(s) on the scanner platen or document feeder and press the Start button 242); and a message (350 FIG. 15) that the items are being scanned. After the scanning is complete, the scan job selection menu 330 in FIG. 13 can once again be displayed on the interface 222 of the scanning device 204/232. Again, after the scanning by the optical sensors, all selected post-scanning processing occurs automatically (without any additional user actions or menu selections).

Selection of an editing option 332A-332E causes the display of the aforementioned scanning options and post-scan processing options (e.g., FIGS. 6-10) on the interface 222 of the scanning device 204/232, while selection a repeat scan option 333A-333E causes display of the repeat scan job input menu 310 on the interface 222 of the scanning device 204/232.

Note again that when the repeat scan option 312 shown in FIG. 11 is selected to be included in the scan job, the scanning device is configured to, or controlled by the application to, repeat the process of executing the selected scan job a number of times equal to the repeat amount.

Different items are scanned during each repeat of the selected scan job, and therefore each repeat of the selected scan job produces a different electronic image file. However, the scanning device is configured to, or controlled by the application to, subject each different electronic image file to the same post-scanning processing options of the selected scan job.

Figure 16:
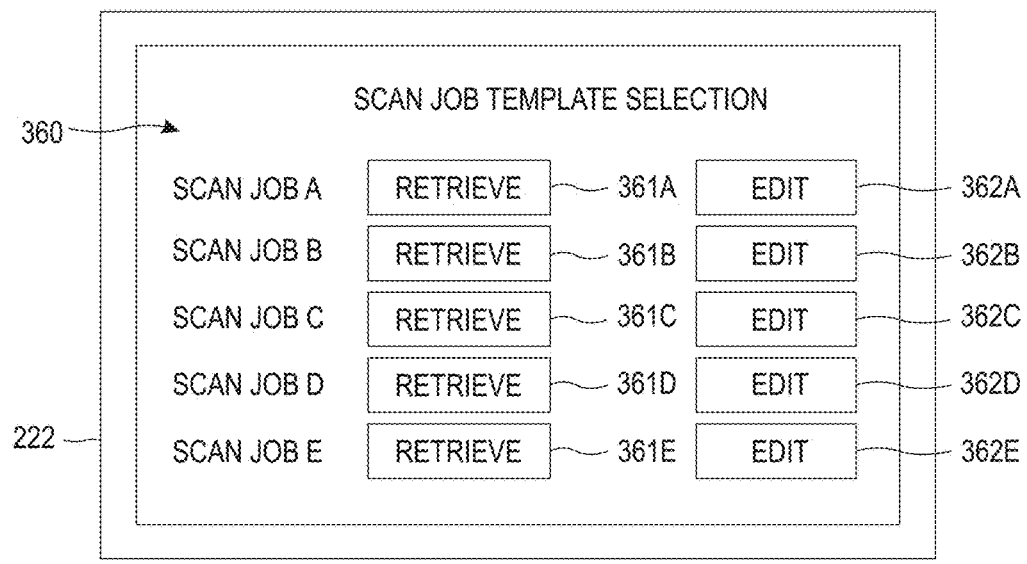

User selection of the select saved scan job option 255 in FIG. 5 causes the graphic user interface 212 of the computerized device 200 to display a scan job template selection menu 360 similar in concept to the one shown in FIG. 16 (which can be a sub-menu of the remote scan job menu 250). For each of the previously saved scan jobs (Scan Job A-Scan Job E) which act as templates, the user has the option to retrieve (361A-361E) one of the saved scan jobs from electronic memory, which will cause the scan job queue selection menu 320 shown in FIG. 12 to be displayed, allowing the retrieved scan job template to be added to one of the scan job queues 321-325.

Figure 17:
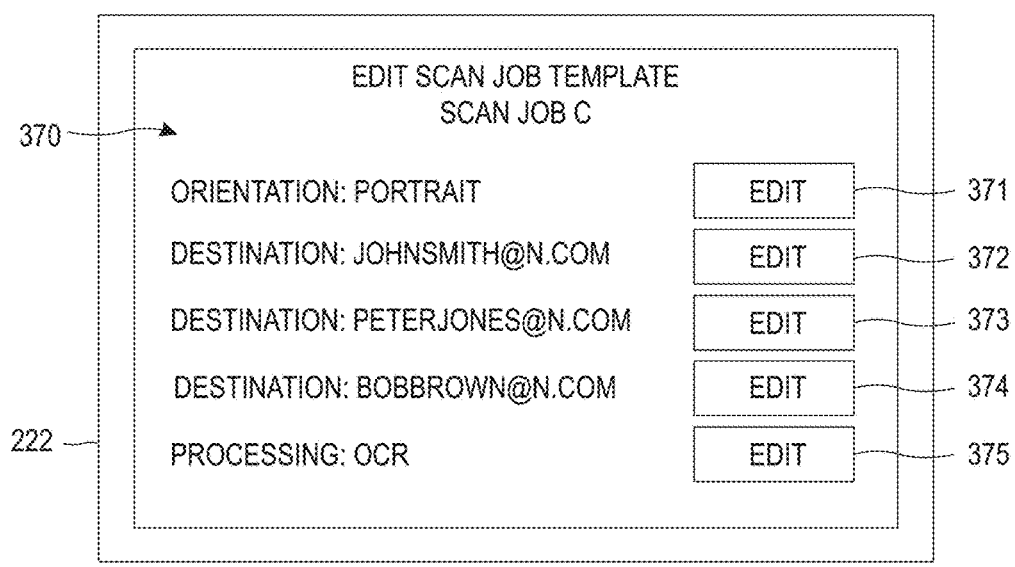

Additionally, the scan job template selection menu 360 shown in FIG. 16 includes edit options (362A-362E) for each of the saved scan jobs (Scan Job A-Scan Job E). Selection of one of the options to edit a previously saved scan job (362A-362E) loads the saved options from the corresponding saved scan job and, in one implementation, causes the display of the remote scan job menu 250 shown in FIG. 5, which allows the user to change any of the existing settings of the corresponding saved scan job. In other implementations, selection of one of the options to edit a previously saved scan job (362A-362E) can load the saved options from the corresponding saved scan job and, in one implementation, causes the display of the edit scan job template 370 shown in FIG. 17. As can be seen in FIG. 17, various saved options of Scan Job C are displayed (e.g., scan orientation, scan destination, post-scan processing, etc.) with corresponding edit options (buttons) 371-375, the selection of which allows the corresponding saved option to be changed.

The hardware described herein plays a significant part in permitting the foregoing method to be performed, rather than function solely as a mechanism for permitting a solution to be achieved more quickly, (i.e., through the utilization of a computer for performing calculations). As would be understood by one ordinarily skilled in the art, the processes described herein cannot be performed by a human alone (or one operating with a pen and a pad of paper) and instead such processes can only be performed by a machine (especially when the volume of data being processed, and the speed at which such data needs to be evaluated is considered). For example, if one were to manually attempt to scan items, perform post-scanning processing (OCR, electronically transmit bitmaps, etc.) as performed by the methods and devices discussed herein, the manual process would either be physically impossible or would be sufficiently inaccurate and take an excessive amount of time so as to render the manual results useless. Specifically, processes such as receiving electronic data representing scanned images, electronically saving scanning and post-scanning options, processing and transmitting scanned data, etc., requires the utilization of different specialized machines, and humans performing such processing would not produce useful results. Further, processes such as, electronic transmission of data over networks, creating bitmaps, altering bitmaps, etc., requires the utilization of different specialized machines. Also, processes such as scanning, processing scanned data pixel-by-pixel, electronically storing bitmaps as 1's and 0's, etc., requires the utilization of different specialized machines, and humans performing such processing would not produce useful results.

Such machine-only processes are not mere "post-solution activity" because the methods utilize machines at each step and cannot be performed without machines. Also, the data transmissions and settings modifications are integral with the process performed by the methods herein, and is not mere post-solution activity, because the methods herein rely upon the previous data receipt to perform the next, and such processing cannot be performed without such electronic transmissions. In other words, these various machines are integral with the methods herein because the methods cannot be performed without the machines (and cannot be performed by humans alone).

Additionally, the methods herein solve many highly complex technological problems. For example, as mentioned above, scanner users suffer from the technological problem of entry of post-scanning options into the sometimes-limited scanner interfaces, which can be challenging. Further, while users can provide recipients' email addresses using remote computing devices that are network-connected to the scanner (e.g., Embedded Web Server, etc.), the items that are to be scanned need to be loaded in the scanner before the instructions to scan are sent from the remote device, which may be acceptable for single user devices, such is not useful in typical office environments where a scanner is shared by many users.

Methods and systems herein solve these and other technological problems by providing remote scanning and post-scanning workflow management using scan job queues. Specifically, the methods and systems herein provide a technical solution of allowing the user to create a scan job from a remote user interface and send the scan job to a scan job queue maintained by a scanning device, where the job will wait in the scan job queue until activated by the user or another operator at the local interface of the scanner. The user at the scanner can select the scan job from the scan queue, make modifications if needed, and press the execute or start button to cause the full scan job (including post-scanning processing) to be completed automatically without additional user intervention or input. This provides a technological benefit by reducing the amount of processing load on the scanning device by moving more processing to remote computerized devices that are more easily operated by users and more efficient at such processing. Further, the methods and systems herein increase the operating speed of the scanning devices by reducing the amount of time users interact with the scanner interface (by simply allowing users to select a previously created scan job from a scan job queue and select start/execute).

For example, as mentioned above, the methods and devices herein greatly simplify the operation from the user's viewpoint by reducing the number of interactions with the scanner interface, which decreases the amount of time needed to perform scanning operations described herein, etc. This, in turn, reduces the amount of time that the scanner interface is on (thereby saving power) and also reduces the load on all processing components of the scanner. Thus, the methods herein reduce the amount and complexity of hardware and software needed, thereby solving a substantial technological problem that is experienced today and thereby improving the performance of the scanners (increasing the speed at which scans are performed, decreasing power consumption, etc.).

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A system comprising:
   an application configured to control a computerized device having a computer interface controlled by the application to display a remote scan job menu for at least post-scanning processing options for unexecuted scan jobs within unexecuted scan job queues,
   wherein the computerized device is in communications with a scanning device,
   wherein the application is configured to control the scanning device to receive at least one of the unexecuted scan jobs in at least one of the unexecuted scan job queues,
   wherein the scanning device comprises a scanner interface, wherein the scanner interface is controlled by the application to display at least one of the unexecuted scan job queues and is configured to receive selection of one of the unexecuted scan jobs from one of the unexecuted scan job queues to identify a selected scan job,
   wherein the scanning device is controlled by the application to execute the selected scan job in response to the selection of one of the unexecuted scan jobs by scanning items provided to the scanning device to produce an electronic image file, and
   wherein the scanning device is controlled by the application to process the electronic image file by performing the post-scanning processing options within the selected scan job on the electronic image file.

2. The system according to claim 1, wherein the computer interface is further configured to display a repeat scan option and, in response, receive a repeat amount into the repeat scan option, wherein the scanning device is controlled by the application to repeat executing the selected scan job a number of times equal to the repeat amount, wherein different items are scanned during each repeat of the executing of the selected scan job, wherein each repeat of the executing of the selected scan job produces a different electronic image file, and wherein the scanning device is controlled by the application to subject each different electronic image file to the post-scanning processing options of the selected scan job.

3. The system according to claim 1, wherein the post-scanning processing options comprise at least one of:

instructions to the scanning device to perform at least one of optical character recognition processing, image enhancement processing, and image compression processing of the electronic image file to create a scanner processed file;

instructions to the scanning device to transmit the electronic image file from the scanning device to one or more remote processing devices separate from the scanning device for at least one of optical character recognition processing, image enhancement processing, image compression processing, and printing processing of the electronic image file by the remote processing devices, to create a remote processed file;

instructions to the scanning device to transmit the electronic image file or the scanner processed file from the scanning device to one or more recipient computerized devices separate from the computerized device; and instructions to the remote processing devices to transmit the remote processed file from the remote processing device to the one or more recipient computerized devices separate from the computerized device.

4. The system according to claim 1, wherein a server device is in communication with the computerized device and the scanning device through a computer network, wherein the unexecuted scan job queues are stored on the server device, and wherein each of the unexecuted scan job queues receives unexecuted scan jobs from multiple computerized devices.

5. The system according to claim 1, wherein the scanning device includes optical sensors, wherein the scanning device is controlled by the application to execute the selected scan job immediately after receiving the selection of one of the unexecuted scan jobs, without intervening processing, and wherein the scanning device is controlled by the application to execute the selected scan job by displaying, on the scanner interface:

instructions to load the items to optical sensors of the scanning device and press a Start button; and a message that the items are being scanned.

6. The system according to claim 1, wherein the scanner interface is further configured to display a menu option to edit one or more of the unexecuted scan jobs in the unexecuted scan job queues.

7. The system according to claim 1, wherein the remote scan job menu is configured to display scanning options, and wherein the scanning options include at least one of a number of pages to scan, a scanning resolution, a scanning orientation, and a sheet size.

8. A system comprising:

a computerized device having a computer interface configured to display a remote scan job menu, wherein the remote scan job menu is configured to display scanning options and post-scanning processing options, wherein the computerized device is configured to create one or more unexecuted scan jobs from inputs into the scanning options and the post-scanning processing options of the remote scan job menu, wherein the remote scan job menu is configured to display selection options from among unexecuted scan job queues into which the unexecuted scan jobs will be sent, wherein the remote scan job menu is configured to receive selection of one of the unexecuted scan job queues for each of the unexecuted scan jobs, and wherein the computerized device is configured to add the unexecuted scan jobs to corresponding selected ones of the unexecuted scan job queues in response to the selection of one of the unexecuted scan job queues; and a scanning device in communication with the computerized device over a network, wherein the scanning device is configured to receive at least one of the unexecuted scan jobs in at least one of the unexecuted scan job queues, wherein the scanning device comprises a scanner interface, wherein the scanner interface is configured to display at least one of the unexecuted scan job queues and menu options for selecting one of the unexecuted scan jobs within the unexecuted scan job queues, wherein the scanner interface is configured to receive selection of one of the unexecuted scan jobs from one of the unexecuted scan job queues to identify a selected scan job, wherein the scanning device includes optical sensors, wherein the scanning device is configured to execute the selected scan job in response to the selection of one of the unexecuted scan jobs by scanning items provided to the scanning device using the optical sensors to produce an electronic image file, and wherein the scanning device is configured to process the electronic image file by performing the post-scanning processing options within the selected scan job on the electronic image file.

9. The system according to claim 8, wherein the computer interface is further configured to display a repeat scan option and, in response, receive a repeat amount into the repeat scan option, wherein the scanning device is configured to repeat executing the selected scan job a number of times equal to the repeat amount, wherein different items are scanned during each repeat of the executing of the selected scan job, wherein each repeat of the executing of the selected scan job produces a different electronic image file, and wherein the scanning device is configured to subject each different electronic image file to the post-scanning processing options of the selected scan job.

10. The system according to claim 8, wherein the post-scanning processing options comprise at least one of:

instructions to the scanning device to perform at least one of optical character recognition processing, image enhancement processing, and image compression processing of the electronic image file to create a scanner processed file;

instructions to the scanning device to transmit the electronic image file from the scanning device to one or more remote processing devices separate from the scanning device for at least one of optical character recognition processing, image enhancement processing, image compression processing, and printing processing of the electronic image file by the remote processing devices, to create a remote processed file;

instructions to the scanning device to transmit the electronic image file or the scanner processed file from the scanning device to one or more recipient computerized devices separate from the computerized device; and instructions to the remote processing devices to transmit the remote processed file from the remote processing device to the one or more recipient computerized devices separate from the computerized device.

11. The system according to claim 8, further comprising a server device in communication with the computerized device and the scanning device through the network, wherein the unexecuted scan job queues are stored on the server device, and wherein each of the unexecuted scan job queues receives unexecuted scan jobs from multiple computerized devices.

12. The system according to claim 8, wherein the scanning device is configured to execute the selected scan job immediately after receiving the selection of one of the unexecuted scan jobs, without intervening processing, and wherein the scanning device is configured to execute the selected scan job by displaying, on the scanner interface:

instructions to load the items to optical sensors of the scanning device and press a Start button; and a message that the items are being scanned.

13. The system according to claim 8, wherein the scanner interface is further configured to display a menu option to edit one or more of the unexecuted scan jobs in the unexecuted scan job queues.

14. The system according to claim 8, wherein the scanning options include at least one of a number of pages to scan, a scanning resolution, a scanning orientation, and a sheet size.

15. A method comprising:

providing a remote scan job menu through a computer interface of a computerized device that is in communication with a scanning device;

displaying, on the remote scan job menu, scanning options and post-scanning processing options;

receiving, into the remote scan job menu, inputs to the scanning options and the post-scanning processing options;

creating, by the computerized device, one or more unexecuted scan jobs using the inputs to the scanning options and the post-scanning processing options;

displaying, on the remote scan job menu, selection options from among unexecuted scan job queues into which the unexecuted scan jobs will be sent;

receiving, into the remote scan job menu, selection of one of the unexecuted scan job queues for each of the unexecuted scan jobs;

adding, by the computerized device, the unexecuted scan jobs to corresponding selected ones of the unexecuted scan job queues in response to the selection of one of the unexecuted scan job queues;

receiving, by the scanning device, at least one of the unexecuted scan jobs in at least one of the unexecuted scan job queues;

displaying, by the scanning device, at least one of the unexecuted scan job queues on a scanner interface of the scanning device, wherein the unexecuted scan job queues are displayed on the scanner interface to provide menu options for selecting one of the unexecuted scan jobs within the unexecuted scan job queues;

receiving, by the scanning device, selection of one of the unexecuted scan jobs from one of the unexecuted scan job queues through the scanner interface to identify a selected scan job;

executing, by the scanning device, the selected scan job in response to the selection of one of the unexecuted scan jobs, by scanning items provided to the scanning device, to produce an electronic image file; and processing, by at least the scanning device, the electronic image file by performing the post-scanning processing options within the selected scan job.

16. The method according to claim 15, wherein the remote scan job menu is further provided to display a repeat scan option, and wherein the method further comprises:

receiving, into the remote scan job menu, a repeat amount into the repeat scan option; and repeating, by the scanning device, the executing of the selected scan job a number of times equal to the repeat amount, wherein different items are scanned during each repeat of the executing of the selected scan job, wherein each repeat of the executing of the selected scan job produces a different electronic image file, and wherein each different electronic image file is subjected to the post-scanning processing options of the selected scan job.

17. The method according to claim 15, wherein the post-scanning processing options comprise at least one of:

instructions to the scanning device to perform at least one of optical character recognition processing, image enhancement processing, and image compression processing of the electronic image file to create a scanner processed file;

instructions to the scanning device to transmit the electronic image file from the scanning device to one or more remote processing devices separate from the scanning device for at least one of optical character recognition processing, image enhancement processing, image compression processing, and printing processing of the electronic image file by the remote processing devices, to create a remote processed file;

instructions to the scanning device to transmit the electronic image file or the scanner processed file from the scanning device to one or more recipient computerized devices separate from the computerized device; and instructions to the remote processing devices to transmit the remote processed file from the remote processing device to the one or more recipient computerized devices separate from the computerized device.

18. The method according to claim 15, further comprising storing the unexecuted scan job queues on one or more server devices that are in communication with the computerized device and the scanning device through a computer network, wherein each of the unexecuted scan job queues receives unexecuted scan jobs from multiple computerized devices.

19. The method according to claim 15, wherein the executing the selected scan job is performed immediately after the receiving the selection of one of the unexecuted scan jobs, without intervening processing, and wherein the executing the selected scan job comprises displaying, by the scanning device on the scanner interface:

instructions to load the items to optical sensors of the scanning device and press a Start button; and a message that the items are being scanned.

20. The method according to claim 15, wherein the displaying of the unexecuted scan job queues on the scanner interface further comprises a menu option to edit one or more of the unexecuted scan jobs in the unexecuted scan job queues.

* * * * *